(12) United States Patent
Prieto

(10) Patent No.: US 8,754,768 B2
(45) Date of Patent: Jun. 17, 2014

(54) REAL TIME SAFETY SYSTEMS

(75) Inventor: Robert Prieto, Princeton Junction, NJ (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 172 days.

(21) Appl. No.: 13/525,799

(22) Filed: Jun. 18, 2012

(65) Prior Publication Data
US 2013/0335221 A1  Dec. 19, 2013

(51) Int. Cl.
G08B 21/00 (2006.01)
G08B 23/00 (2006.01)

(52) U.S. Cl.
USPC . 340/540; 340/522; 340/539.13; 340/539.23; 340/573.4; 340/686.6

(58) Field of Classification Search
USPC .............. 340/540, 541, 500, 521, 522, 539.1, 340/539.13, 539.23, 539.26, 573.1, 573.4, 340/686.6, 686.5, 691.1, 691.6, 693.5, 905, 340/908.1, 988, 991; 307/326; 701/9, 23, 701/50; 702/3; 116/137 R, 209, 215
See application file for complete search history.

(56) References Cited

U.S. PATENT DOCUMENTS

| | | | |
|---|---|---|---|
| 6,559,774 B2 * | 5/2003 | Bergan et al. | 340/908 |
| 6,600,426 B1 * | 7/2003 | Sacks et al. | 340/664 |
| 6,917,300 B2 * | 7/2005 | Allen | 340/686.6 |
| 7,752,020 B2 | 7/2010 | Seppanen et al. | |
| 2006/0015254 A1 * | 1/2006 | Smith | 702/3 |
| 2007/0027732 A1 | 2/2007 | Hudgens | |
| 2009/0111462 A1 | 4/2009 | Krinsky et al. | |
| 2011/0238647 A1 | 9/2011 | Ingram et al. | |
| 2011/0313874 A1 | 12/2011 | Hardie et al. | |

FOREIGN PATENT DOCUMENTS

WO  2010/077006  7/2010

OTHER PUBLICATIONS

"Smartphone app links shoppers with stores", CBC News, Dec. 21, 2011, http://www.cbc.ca/player/News/Technology+and+Science/ID/2179269230/?page=10.
"Drawing a Part in 2D from the Spreadsheet", Microvellum Help, 2012, http://www.microvellum.com.
King, M.B., "Checking In: A Look at Location-Based Services", Microsoft Tag, 2011, http://tag.microsoft.com/community/blog/t/checking_in_a_look_at_location-based_services.aspx.

* cited by examiner

*Primary Examiner* — Anh V La
(74) *Attorney, Agent, or Firm* — Fish & Tsang, LLP

(57) ABSTRACT

A system for managing hazards in a construction site is presented. One aspect of the inventive subject matter includes a hazard management system comprising a hazard context database, a sensor interface, and a hazard analysis engine. The sensor interface is configured to acquire a site data feed that is representative of a construction site. The hazard analysis engine is configured to (i) instantiate a hazard object by comparing the site data feed to hazard criteria of the plurality of hazard contexts, (ii) update the hazard object based on the site data feed, (iii) generate hazard notification criteria related to the hazard object, (iv) obtain worker attributes from the site data, and (v) transmit a hazard notification to an output device when the worker attributes cause satisfaction of the hazard notification criteria.

20 Claims, 3 Drawing Sheets

REAL TIME SAFETY SYSTEMS

FIELD OF THE INVENTION

The field of the invention is the management of construction hazards.

BACKGROUND

Hazards in plants and construction sites are often difficult to manage. The size of these plants and construction sites and the dynamic nature of the hazards add to the complexities. For example, an area in a construction site may appear to be safe at a moment but becomes hazardous in the next moment when heavy machineries or toxic materials are moved to the area. In another example, the hazardous level of a building construction site may vary over time as different hazardous conditions exist at different stages of the construction.

Various systems and methods have been suggested for managing construction sites. For example, U.S. patent application publication 2007/0027732 to Hudgens (published in February, 2007) proposes a system that stores geographical locations of different hazards in a construction site and generates alerts to workers when they are in proximity of those areas. Another example of a construction risk management system is found in U.S. Pat. No. 7,752,020 to Seppanen et al. (issued in July, 2010). Another example of generating alerts for construction workers is found in U.S. patent application publication 2011/0313874 to Hardie et al. (published in December, 2011), which teaches a system that generates notifications to workers based on their locations.

Other examples of location based alerts and services include:
- U.S. patent application publication 2011/023864 to Ingram et al. titled "System for Event-Based Intelligent-Targeting", filed Mar. 23, 2011;
- U.S. patent publication 2009/0111462 to Krinsky et al. titled "Location Based Service Quality Assessment", filed Jun. 19, 2008; and
- International application publication WO 2010/077006 to Kim titled "Location Information Tagging Method and Apparatus for Location-Based Service in Wireless Commmunication System", filed Dec. 23, 2009.

However, none of the systems effectively deal with the dynamic nature of hazards in the constructions sites. Thus, there is still a need for a suitable system and method that simplifies the task of managing hazards in a plant or construction site.

SUMMARY OF THE INVENTION

The inventive subject matter provides systems, apparatus, and methods for managing hazards in a construction site. One aspect of the inventive subject matter includes a hazard management system comprising a hazard context database, a sensor interface, and a hazard analysis engine. The hazard context database stores several hazard contexts, where each hazard context includes hazard criteria and hazard attributes. The sensor interface is configured to acquire a site data feed having sensor data that is representative of a construction site. The hazard analysis engine is coupled to both the sensor interface and the hazard context database. The hazard analysis engine is configured to (i) instantiate a hazard object from a hazard context by comparing the site data feed to hazard criteria of the plurality of hazard contexts, (ii) update hazard attributes associated with the hazard object based on the site data feed and the hazard contexts, (iii) generate hazard notification criteria related to the hazard object based on the associated hazard attributes, (iv) obtain worker attributes from the site data, and (v) transmit a hazard notification to an output device when the worker attributes cause satisfaction of the hazard notification criteria.

In some embodiments, the analysis engine is further configured to instantiate the hazard object when a portion of the site data meets the hazard criteria of at least one of the hazard contexts. In some embodiments, the site data includes at least one of the following: environment data, data related to locations of different materials, data related to locations of different machineries, data related to locations of workers, or workers' attributes.

The analysis engine of some of these embodiments is configured to instantiate the hazard object by initializing the hazard attributes associated with the hazard object based on the hazard attributes of at least one of the hazard contexts. In addition, the analysis engine of some embodiments is also configured to deconstruct the hazard object when the portion of the site data no longer meets the hazard criteria of any one of the plurality of hazard contexts.

In some embodiments, the hazard object is a dynamic hazard object. In these embodiments, the site data feed is a real-time site data feed, and the analysis engine is further configured to continuously update the hazard attributes associated with the hazard object based on the real-time site data feed and the hazard contexts.

The analysis engine of some embodiments is also configured to monitor several hazard objects. In some of these embodiments, the hazard management system also includes a dashboard that is configured to display a visual representation of the several hazard objects. In addition to monitoring, the analysis engine of some embodiments is configured to log a history of the several hazard objects, and the dashboard of some embodiments is configured to display the logged history of each of the hazard objects. In some embodiments, the analysis engine of the hazard context management system is also configured to search for hazard objects based on a set of hazard attributes.

As mentioned, the analysis engine of some embodiments is configured to generate hazard notification criteria related to the hazard object based on the associated hazard attributes, and transmit a hazard notification to an output device when the worker attributes obtained from the site data cause satisfaction of the hazard notification criteria. In some embodiments, the hazard object comprises information that indicates a location and a boundary within the construction site, and each worker's attributes include current location of the worker and the certifications of the worker. The hazard attributes associated with the hazard object in some of these embodiments include compliance requirements for workers to enter a boundary of the hazard object. Thus, in some of these embodiments, the analysis engine is configured to generate the hazard notification criteria that include a history of the hazard object, compliance requirements for the workers, and jurisdiction.

In addition, analysis engine of some embodiments is configured to transmit a notification when the worker attributes indicate that a worker without proper compliance enters a boundary associated with a hazard object. The hazard context management system of some of these embodiments also includes a dashboard that is configured to allow a supervisor to authorize a particular worker without proper compliance to enter the boundary of the hazard object. Furthermore, the analysis engine of some embodiments is also configured to log a history of notifications caused by each worker on the construction site.

In some embodiments, the analysis engine is configured to generate an alert to a supervisor (or the person who is responsible for managing the construction site) when a hazard condition in the construction site is over a threshold. In these embodiments, the hazard context management system also includes an alert criteria database that stores a set of hazard alert criteria. Thus, the analysis engine of some embodiments generates an alert when the hazard attributes of one or more hazard objects collectively satisfy the set of hazard alert criteria.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
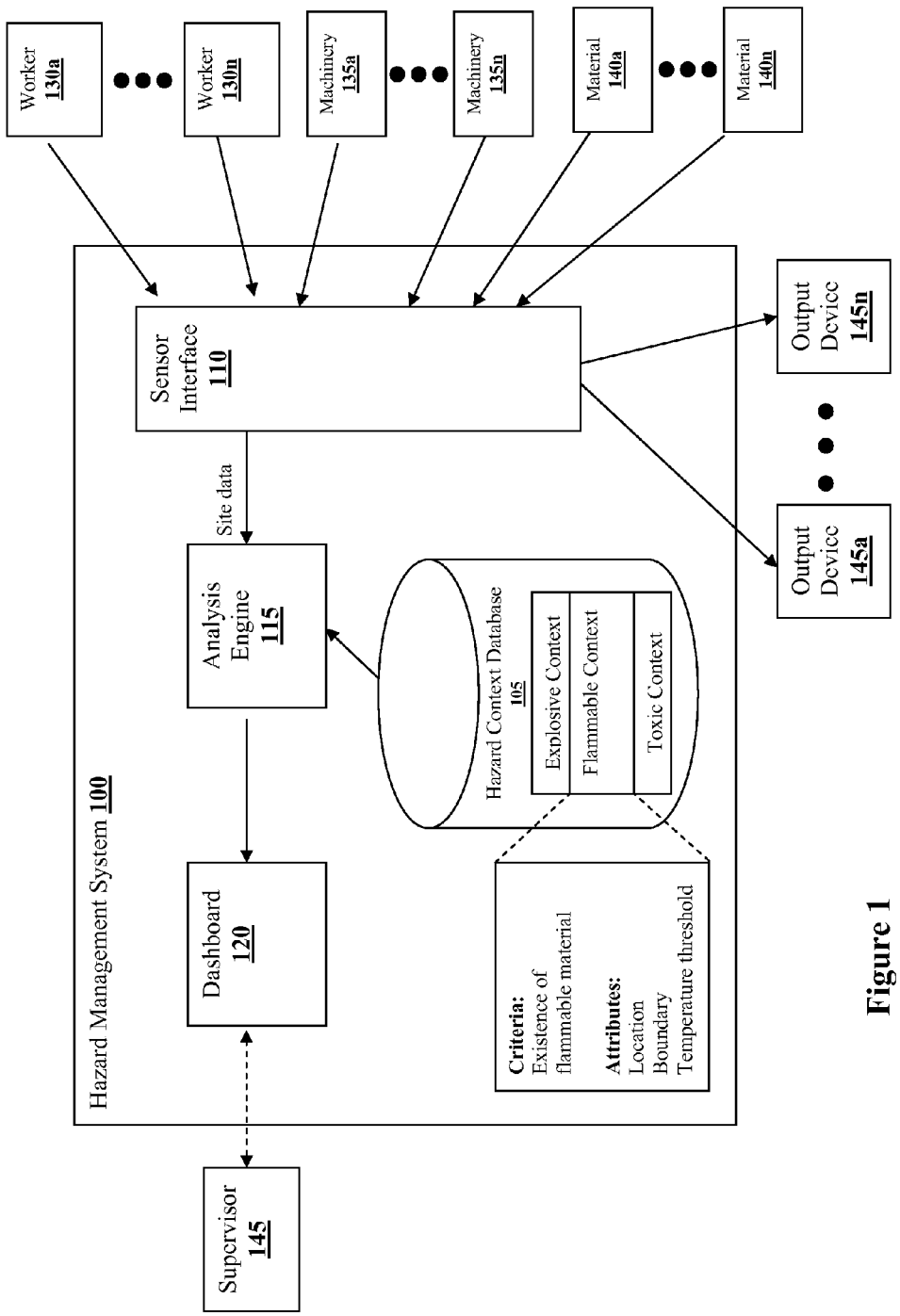
FIG. 1 illustrates an example hazard management system.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

It should be noted that while the following description is drawn to a computer/server based hazard management system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, the terms "coupled to" and "coupled with" are also used euphemistically to mean "communicatively coupled with" over a network where two or more devices are configured to exchange data over the network, possibly via one or more intermediary devices.

According to some aspects of the present invention, a hazard management system that includes a hazard context database, a sensor interface, and a hazard analysis engine is presented. Specifically, the hazard management system acquires a live site feed that represents real-time information about a construction site. By comparing the information from the site feed and the hazard contexts stored in the hazard context database, the hazard analysis generates and updates one or more hazard objects for the construction site. The hazard objects include attributes that allow the hazard analysis engine to transmit notifications and alerts when certain hazardous conditions arise.

FIG. 1 illustrates an example of a hazard management system 100. As shown, the hazard management system 100 includes a hazard context database 105, a sensor interface 110, and an analysis engine 115. In some embodiments, the hazard context database 105 stores several hazard contexts. It should be noted that the term "database" in the following description is used to mean a collection of data, which can be stored in any formats and data structures (e.g., a spreadsheet, XML format, a document file, a relationship database, etc.). Each hazard context can be considered a separate, distinct manageable object within the database.

Each hazard context stored in the hazard context database 105 represents a particular hazardous condition that may arise in a construction site. As shown in FIG. 1, the hazard context database 105 stores an explosive hazard context, an flammable hazard context, and a toxic hazard context. The explosive hazard context represents a condition that is easily exploded, the toxic hazard context represents a toxic condition, and the flammable hazard context represents a condition that easily catches on fire. Although the hazard context database 105 in this figure is shown to include only three hazard contexts, other types of hazard contexts that represent other hazardous condition may also be included. The user may also add, update, or remove hazard contexts from the hazard context database 105 as needed. The hazard contexts can be stored according a one or more schemas. For example, the hazard contexts could be stored according to a hazard classification system (e.g., fire, personnel, toxic, biohazard, mechanical, etc.). Further, the hazard context could be stored according to a hierarchy, possibly where a hazard context could inherit properties from its parent. Consider a scenario of an explosive hazard context. The explosive hazard context might inherit properties of a fire hazard context. One should appreciate that a hazard context does not necessarily represent an actual hazard. Rather, a hazard context represents the characteristics, requirements, or optional conditions that a hazard could have.

Each of these hazard contexts includes hazard criteria and hazard attributes. The hazard criteria of a hazard context describe the circumstances, requirements, or optional conditions that must be satisfied by the site data (or a portion of the site data) before an instance of the hazard context is instantiated. Preferably the hazard criteria are defined as a function of information derivable from site data available in a site feed. For example, the hazard criteria could depend on locations of equipment or even specific individuals as obtained from location sensors. In view that the sensor data available associated with a construction site can cover a broad spectrum of modalities, the hazard criteria can depend on many different types of data or data values. Example type of data on which the hazard criteria can depend include location data, position data, movement data, temperature data, weather data, personnel data, management data, altitude data, jurisdiction data, or other types of data. FIG. 1 illustrates that the hazard criteria for the flammable hazard context include the existence of flammable material on the construction site. Thus, the analysis engine 115 would instantiate an instance of the flammable hazard object when the site data indicates that a batch of flammable materials exists. As another concrete example consider an explosive hazard context; its hazard criteria might function based on existence of certain explosive materials (e.g., dynamite, gasoline, etc.) and location of fire hazards.

Hazard contexts further include hazard attributes that represent the nature of the hazard context, or the actual hazard in the construction site. Some attributes might comprise NULL values that are populated upon instantiation of an actual hazard within the system. For example, a "location" attribute within a hazard context might not have a value until a corresponding hazard is created. Other attributes can comprise a priori values before instantiation of a corresponding hazard. For example, the pre-defined attributes could include a hazard context identifier, a hazard name or identifier, hazard materials, or other information.

In some embodiments, entities accessing the context database 105 to search for or otherwise manage the contexts. For example, a user could create a new hazard context for use within the system. The user could also modify the hazard criteria and hazard attributes of each hazard context within the system to fit a specific project or a particular jurisdiction. Hazard context database 105 can be further configured to support other management roles or responsibilities possibly including deleting hazard context, decommissioning hazard contexts, combining hazard contexts, copying hazard contexts, or other types of management functions.

In some embodiments, the sensor interface 110 is configured to acquire a site data feed having site data that is representative of the construction site. The site data feed can include a broad spectrum of site data, possibly collect through one or more sensors. Example information within the site feed could include environment data, locations and other attributes of machineries, materials, workers on the construction site. In some embodiments, the information included in the site data feed is collected from different sources or sensors. For example, the information can be collected from location tracking devices that are attached to each worker, machinery, and batch of materials in the construction site. Location tracking devices in this description are used to mean any types of devices that allow the location of the device to be accurately tracked using technology such as GPS, Bluetooth beacon arrays, etc. In addition to location tracking devices, other types of sensor devices (e.g., temperature sensor, accelerometer, pressure sensor, etc.) can also be attached to different locations, machineries, materials, and workers on the construction site to provide up-to-date (real-time) information to the sensor interface 110. In addition to the sensor devices, the sensor interface 110 of some embodiments also allow workers of the construction site to manually enter updated information through a graphical user interface.

One should appreciate that the site feed can include many different types of data depending on the nature of the site data sources. The data sources can include active sensors or passive sensors. Active sensors are typically powered and collect or emit sensor data. A worker's cell phone can be considered an active sensor device because it can actively collect or transmit sensor data (e.g., GPS coordinates, images, sounds, acceleration, etc.). Passive sensors typically lack power to transmit their data; an RFID tag for example. Still further, the site data sources do not necessarily have to be local to the construction site. Rather, the site data could be from an external source, possibly reflecting weather, news events, management information, client data, or other sources.

Different embodiments use different technique to implement a real-time site data feed. In some embodiments, the sensor interface 110 sends a polling signal to the different sensor devices on the construction site periodically (e.g., every second, every minute, etc.) in order to retrieve up-to-date data from the sensor devices. In other embodiments, the sensor devices are configured to send updated information to the sensor interface 110 only when the information is changed.

The analysis engine 115 of some embodiments is coupled to both the hazard context database and the sensor interface. In some of these embodiments, the analysis engine 115 is configured to instantiate a hazard object from a hazard context by comparing the site data feed to hazard criteria of the hazard contexts stored in the hazard context database. The analysis engine 115 of some embodiments is configured to instantiate the hazard object when a portion of the site data meets the hazard criteria of at least one of the hazard contexts. Thus, analysis engine 115 monitors the site feed for data that would indicate a hazard is likely. In some embodiments, analysis engine 115 can search for relevant hazard contexts based on site attributes derived form the site feed. In other embodiments, analysis engine 115 can have a list of relevant hazard contexts that pertain to the construction. In which case, analysis engine 115 can have one or more event listeners that monitor the site feed. When a hazard context is satisfied by the site feed, analysis engine 115 creates an instantiation of a corresponding hazard. For example, when the site data indicates that a batch of dynamite has arrived at a location of the construction site, the analysis engine 115 of some embodiments instantiates a hazard object representing an actual hazard because the existence of the batch of dynamite satisfies the hazard criteria of the explosive hazard context. In some embodiments, the hazard object might be associated with more than one hazard contexts when the portion of the site data (e.g., the existence of a batch of dynamite) satisfies the hazard criteria of more than one hazard contexts. One should appreciate that the hazard context can remain unaltered and can remain active within the system should another similar hazard become present.

In some embodiments, the analysis engine 115 is configured to instantiate the hazard object by initializing one or more of the hazard attributes associated with the hazard object. In some of these embodiments, these hazard attributes are derived from the hazard attributes of the at least one hazard context. In other embodiments, the analysis engine 115 is configured to initialize additional hazard attributes based on the information from the site feed; for example location of the items (e.g., machineries, materials, workers, etc.) that cause the satisfaction of the hazard criteria, a boundary, relationships between the associated hazard contexts, location of the particular hazard object, other hazard objects that overlapped or located in proximity of the hazard object, or other information.

In some embodiments, the instantiated hazard object is a dynamic hazard object. That is, the hazard object changes its attributes and characteristics based on updated information from the real-time site data feed. In these embodiments, the analysis engine 115 is further configured to continuously update the hazard attributes of the hazard object based on the real-time data feed and the hazard contexts. For example, when the batch of dynamite that gives rise to the hazard object is moved to a different location, the location attribute of the hazard object is updated by the analysis engine. In addition to updating the hazard attributes of the hazard object, the analysis engine 115 of some embodiments deconstructs the hazard object when the portion of site data no longer satisfies the hazard criteria of the hazard contexts (e.g., when the batch of dynamite have been moved out of the construction site, when they have been consumed, etc.).

A construction site is usually enormously complex and contains many different types of hazardous condition. Thus, in some preferred embodiments, the analysis engine 115 is configured to instantiate more than one hazard object to represent different hazardous conditions on the construction site, and to continuously monitor and update the hazard objects. In some of these embodiments, the hazard management system 100 also includes a dashboard 120 that is configured to provide a visual representation of the hazard objects of the construction site. As such, someone such as a supervisor of the construction site who is responsible for managing the site can get an up-to-date visual representation of the site.

In some embodiments, the visual representation comprises a graphical representation of the hazard objects where the representations of the hazard objects are displayed in different locations on a virtual construction site map that correspond to the different locations of the hazardous conditions. In addition, the dashboard 120 of some embodiments is configured to provide a graphical user interface to present an interactive visual representation of the hazard objects. In these embodiments, a user can interact with the interface of the dashboard 120 to select a particular hazard object to perform additional tasks (e.g., obtain more information about the hazard object).

In view that hazard objects are dynamic in nature and can change with time, analysis engine 115 can monitor each hazard object individually, collectively, or from one construction project to another. Thus analysis engine 115 can provide, at least at some level, predictions how a hazard object might change with time. For example, a hazard object's location might change with time as an associated material is moving. Such, predictions can have value especially when two or more hazard objects have conflicting attributes; an explosive hazard object might be moving toward a fire hazard object for example. Analysis engine 115 can also apply statistical information gathers over numerous construct projects to provide a confidence, probability, or likelihood that the hazard object becomes or is hazardous.

Using the instantiated hazard objects, the hazard management system 100 of some embodiments also provide the ability to generate and send notification to workers and/or supervisors based on a certain event that occurred in the construction site. In these embodiments, the analysis engine 115 is configured to generate hazard notification criteria related to each hazard object based on the associated hazard attributes, and transmit a hazard notification to an output device (e.g. output devices 145a-145n) when the worker attributes obtained from the site data cause satisfaction of the hazard notification criteria.

In some embodiments, the hazard notification criteria include a criterion as simple as no one is allowed to enter the boundary associated with the hazard object. In other embodiments, the hazard notification criteria include additional information such as compliance requirement information, jurisdictional information, client information, construction firm information, legal information, regulatory information, or other types of information that do not necessarily depend on sensor data. For example, the hazard notification criteria in some embodiments include compliance requirements such as a requirement of finishing an explosive material training in order for a worker to be located within fifty meters of the explosive materials. Thus, when the site data feed indicates that a worker without explosive material training comes within fifty meters of the location of the explosive materials, the analysis engine 115 is configured to transmit a notification to an output device that is attached to the worker to warn the worker, and/or to an output device for the supervisor so that he/she can take appropriate action.

The hazard notification criteria can also include one or more escalation conditions. As conditions associated with a hazard object becomes more urgent, more dangerous, or higher priority, analysis engine 115 can consult the escalation conditions to determine how to send the notification. At first, a notification might merely comprise an email sent once a day. As the hazard object become more urgent, analysis engine 115 might send hourly text messages. Still further, a more urgent notification might include phone calls to a worker's cell phone. Even more urgently, a notification could include multiple calls to co-workers or even a siren blast.

It is contemplated that a worker's hardhat can be instrumented with sensors or notification reception devices in case the worker does not have access to their cell phone or other reception device. As hazard notifications are sent to the worker, the hardhat could vibrate, emit a sound, or others provide an indication of an imminent hazard.

Since different jurisdictions impose different compliance requirements on construction workers, the hazard notification criteria in some embodiments also include jurisdiction information in addition to compliance requirements. Also, the hazard notification criteria may include information related to the history of the hazard object.

In some embodiments, the analysis engine 115 is also configured to log a history of notifications transmitted that are caused by each worker on the construction site, so that the supervisor may keep track of the behavior of each worker.

Through the dashboard 120, the analysis engine 115 of some embodiments also allow a supervisor to authorize a particular worker to enter the boundary of a hazard object even though the particular work does not have the required compliance requirements. This ability allows for flexibility when special circumstances (e.g., an emergency situation) arise.

In addition to a notification system for the workers, the hazard management system 100 of some embodiments also provide alerts to the supervisor of the construction site based on some conditions arise out of one or more hazard objects. For example, it is contemplated that the hazard management system 100 would send out an alert when explosive materials are located too close to flammable materials. Thus, the hazard management system 100 of these embodiments also includes an alert criteria database that stores a set of hazard alert criteria. In these embodiments, the analysis engine 15 is also configured to generate an alert when the hazard attributes of one or more hazard objects collectively satisfy the set of hazard alert criteria.

Furthermore, the analysis engine 115 of some embodiments is also configured to log a history of the hazard objects of the construction site. In some embodiments, the history of a hazard objects include changes of locations, changes of the hazard attributes, etc. In some of these embodiments, the dashboard 120 is also configured to display the logged history of each of the hazard objects. Through the dashboard 120, the analysis engine 115 of some embodiments is also configured to allow a user to search for hazard objects based on a set of hazard attributes.

Figure 2:
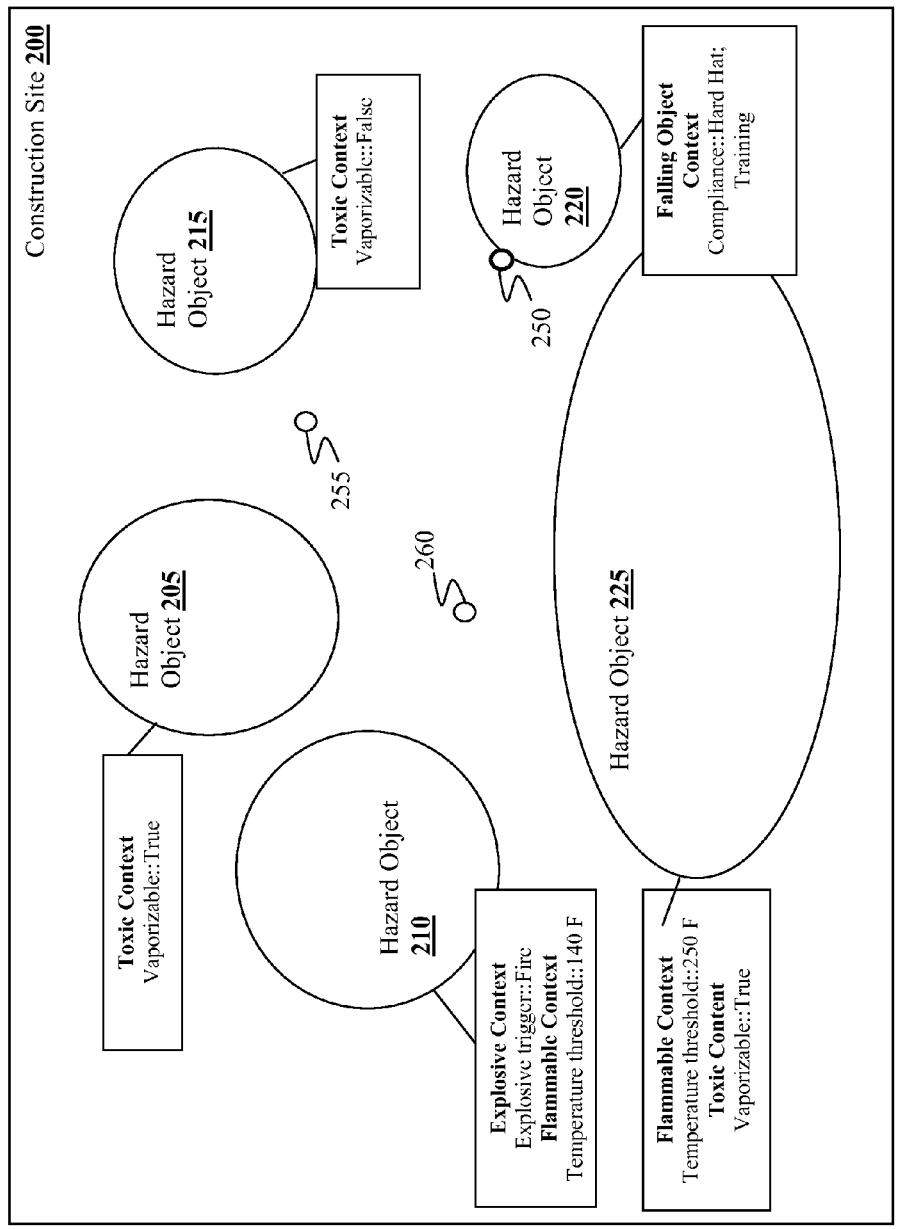
FIG. 2 illustrates examples of hazard objects of a construction site.
Figure 3:
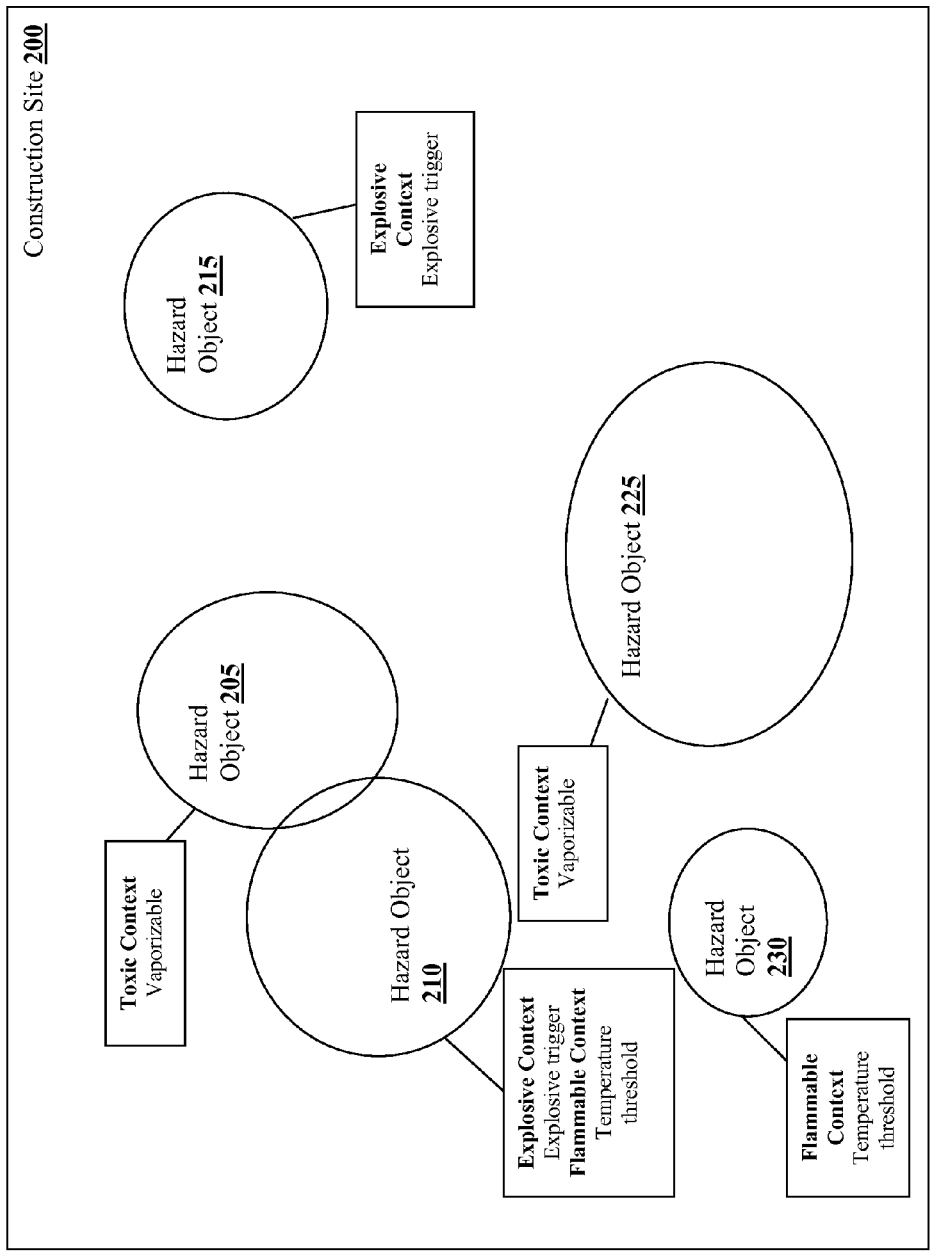
FIG. 3 illustrates other examples of hazard objects of a construction site.

Specific examples of the operations of the hazard management system 100 will now be discussed by reference to FIG. 2 and FIG. 3. Specifically, FIG. 2 illustrates a map of a construction site 200 that includes different types of hazardous conditions arising out of construction machineries, materials, and other elements that are commonly found in a construction site. In addition, a sensor device is attached to each of the construction machineries, batches of materials, workers to provide a live (real-time) site data feed to the hazard management system 100.

Based on the live site data feed from the construction site 200, the hazard management system 100 instantiated hazard objects 205, 210, 215, 220, and 225. Each of the hazard objects 205, 210, 215, 220, and 225 is instantiated because a portion of the site data feed satisfies the hazard criteria of at least one hazard context stored in the hazard context database 105. For example, the analysis engine 115 instantiated hazard object 205 because a portion of the site data satisfies the hazard criteria of the toxic hazard context (e.g., the site data indicates that a batch of toxic material has arrived at a location in the construction site 200). Similarly, hazard object 210 is instantiated because another portion of the site data satisfies the hazard criteria of the explosive hazard context and the flammable hazard object. Using the same technique, hazard object 215 is instantiated by its association with the toxic hazard context, hazard object 220 is instantiated by its association with the falling object hazard context, and hazard object 225 is instantiated by its association with the flammable hazard context and the toxic hazard context.

FIG. 2 illustrates that the analysis engine 115 also initializes hazard attributes for the hazard objects during instantiation. In this example, the analysis engine 115 has initialized the vaporizable attribute with a 'true' value for hazard object 205. The analysis engine 115 also initialized the explosive trigger attribute with a value of 'fire' and the temperature threshold attribute with a value of '140 F' for hazard object 210. For hazard object 215, the analysis engine has initialized the vaporizable attribute with a 'false' value.

Although most of the attributes include only one value, the analysis engine 115 of some embodiments may initialize some attributes of a hazard object with more than one value. For example, the analysis engine 115 in this example initialized the compliance attribute with the values of 'hard hat' and 'training' for hazard object 220. Lastly, the analysis engine 115 initialized the temperature threshold attribute with a value of '250 F' and the vaporizable attribute with a value of 'true' for hazard object 225. As mentioned above, the analysis engine 115 of some embodiments initializes the hazard attributes for a hazard object based on the associated hazard context(s), the geographical location of the hazard, and the environment of the surrounding (including neighboring hazards). Thus, even though hazard objects 205, 215, and 225 have share the vaporizable attribute, the values may be different depending on their respective hazards.

In some embodiments, the analysis engine 115 of some embodiments allows a user to search for hazard objects based on a set of attributes. For example, if a user searches for hazard objects that includes a temperature threshold of a value smaller than 130 F, the analysis engine 115 would return hazard object 210.

In addition, the hazard objects of some embodiments include location and boundary information of the corresponding hazard. FIG. 2 also illustrates the relative location and boundary of the hazard objects 205, 210, 215, 220, and 225 with respect to the construction site 200. Although the boundary of the hazard objects are shown to be elliptical in this example, one skilled in the art would appreciate that the boundary of a hazard object can be of any size, shape, (e.g., regular or irregular shapes), volume, duration, extent, etc.

In addition to hazard objects, FIG. 2 also illustrates the location of workers 250, 255, and 260 on the construction site 200 based on the live site data feed. Specifically, worker 255 is shown to be near hazard object 215 and worker 260 is shown to be near hazard object 225. Worker 250 is also shown to be entering the boundary of hazard object 220. The site data also shows that worker 250 does not have proper training to enter the boundary represented by hazard object 220. Different embodiments of the analysis engine 115 generate different sets of hazard notification criteria. In this example, analysis engine 115 generates a set of hazard criteria that is satisfied when a worker without proper compliance entering the boundary of any hazard objects. Thus, since worker 250 does not have the required compliance, the analysis engine 115 transmits a notification to an output display (preferably an output display that is attached to worker 205, or in addition to an output display of a supervisor of the construction site 200).

In some embodiments, the hazard management system 100 also includes a dashboard 120 for providing a visual presentation of the hazard objects and for allowing a user to interact with the system 100 (e.g., authorizing certain workers to enter the boundary of a hazard object). In some of these embodiments, the visual presentation provided by the dashboard 120 looks similar to what is shown in FIG. 2. In addition to the information of the hazard objects, the visual presentation of some embodiments includes additional selectable buttons (e.g., an input device that is attached to the display or a selectable item on the display) for allowing the user to further interact with the system 100.

As mentioned, the analysis engine 115 of some embodiments is configured to update the set of hazard objects of a construction site based on the live data feed. FIG. 3 illustrates a set of hazard objects based on the live site feed of construction site 200 at a time subsequent to the time in FIG. 2 (e.g., if FIG. 2 represents a set of hazard objects for the construction site 200 at time=n, FIG. 3 represents a set of hazard objects for the construction site 200 at time=n+Δ).

Factors such as movement of the machineries, consumption of materials etc. contribute to the changes of the hazard objects. Thus, the analysis engine 115 of some embodiments is configured to update the set of hazard objects based on these changes in circumstances. As shown, hazard object 205 has moved closer to hazard object 210 such that a portion of their boundaries are overlapped.

In addition, because the site data indicates that the circumstances that give rise to hazard object 220 no longer exists at time=n+Δ, the analysis engine 115 deconstructs hazard object 220. For hazard object 225, since the site data indicates that the flammable materials have been consumed, the analysis engine 115 removes its association from the flammable hazard context, removes the temperature threshold attribute, and reduces the size (boundary) of hazard object 225. Furthermore, since another portion of the site data feed at time=n+Δ satisfies the hazard criteria of the flammable hazard context, the analysis engine 115 instantiates an additional hazard object 230, and initializes its temperature threshold attribute with a value of '150 F'.

In some embodiments, the analysis engine 115 is also configured to generate an alert to the supervisor of the construction site 200 based on the hazardous conditions on the site 200. For example, the analysis engine 115 can be configured to generate an alert when a hazard object that is associated with a toxic hazard context, indicates that it includes vaporizable toxic material and has a boundary that touches upon a boundary of another hazard object that is associated with the flammable hazard context. In this case, the analysis engine 115 would generate an alert at time=n+Δ because hazard object 205 is overlapped with hazard object 210.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A hazard management system comprising:
   a hazard context database storing a plurality of hazard contexts, each hazard context comprises hazard criteria and hazard attributes;
   a sensor interface configured to acquire a site data feed representative of a construction site; and
   a hazard analysis engine coupled to the sensor interface and the hazard context database, and configured to:
      instantiate a hazard object from a hazard context by comparing the site data feed to hazard criteria of the plurality of hazard contexts;
      update hazard attributes associated with the hazard object based on the site data feed and the plurality of hazard contexts;
      generate hazard notification criteria related to the hazard object based on the associated hazard attributes;
      obtain worker attributes from the site data; and
      transmit a hazard notification to an output device when the worker attributes cause satisfaction of the hazard notification criteria.

2. The hazard context management system of claim 1, wherein the analysis engine is further configured to instantiate the hazard object when a portion of the site data meets the hazard criteria of at least one of the plurality of hazard contexts.

3. The hazard context management system of claim 2, wherein the analysis engine is further configured to deconstruct the hazard object when the portion of the site data no longer meets the hazard criteria of any one of the plurality of hazard contexts.

4. The hazard context management system of claim 2, wherein the analysis engine is further configured to instantiate the hazard object by initializing the hazard attributes associated with the hazard object based on the hazard attributes of at least one of the plurality of hazard contexts.

5. The hazard context management system of claim 1, wherein the hazard object is a dynamic hazard object, wherein the site data feed is a real-time site data feed, wherein the analysis engine is further configured to continuously update the hazard attributes associated with the hazard object based on the real-time site data feed and the plurality of hazard context.

6. The hazard context management system of claim 1, wherein the analysis engine is further configured to monitor a plurality of hazard objects.

7. The hazard context management system of claim 6, further comprises a dashboard that is configured to display a visual representation of the plurality of hazard objects.

8. The hazard context management system of claim 6, wherein the analysis engine is further configured to log a history of each of the plurality of hazard objects.

9. The hazard context management system of claim 8, further comprises a dashboard that is configured to display the logged history of each of the plurality of hazard objects.

10. The hazard context management system of claim 1, further comprises an alert criteria database storing a set of hazard alert criteria.

11. The hazard context management system of claim 10, wherein the analysis engine is further configured to generate an alert when the hazard attributes of one or more hazard objects collectively satisfy the set of hazard alert criteria.

12. The hazard context management system of claim 1, wherein the analysis engine is further configured to search for hazard objects based on a set of hazard attributes.

13. The hazard context management system of claim 1, wherein the hazard object comprises information indicating a location and a boundary within the construction site.

14. The hazard context management system of claim 1, wherein each worker's attributes comprise current location of the worker and certifications of the worker.

15. The hazard context management system of claim 1, wherein the hazard notification criteria comprises a history of the hazard object, compliance requirements for the workers, and jurisdiction.

16. The hazard context management system of claim 1, wherein the analysis engine is further configured to transmit a notification when the worker attributes indicate that a worker without proper compliance enters a boundary associated with the hazard object.

17. The hazard context management system of claim 1, wherein the analysis engine is further configured to log a history of notification caused by each worker on the construction site.

18. The hazard context management system of claim 1, wherein the site data comprises at least one of the following: environment data, data related to locations of different materials, data related to locations of different machineries, data related to locations of workers, and workers' attributes.

19. The hazard context management system of claim 1, wherein the hazard attributes associated with the hazard object comprises compliance requirements for workers to enter a boundary of the hazard object.

20. The hazard context management system of claim 19, further comprising a dashboard that is configured to allow a supervisor to authorize a particular worker without proper compliance to enter the boundary of the hazard object.

* * * * *